United States Patent [19]

Lyon et al.

[11] Patent Number: 5,020,610
[45] Date of Patent: Jun. 4, 1991

[54] REMOVABLE FILTER FLUID FLOW SHUTOFF APPARATUS

[75] Inventors: Leland H. Lyon; Richard L. Eggeling, both of Roanoke, Va.

[73] Assignee: Ingersoll-Rand Company, Woodcliff Lake, N.J.

[21] Appl. No.: 486,500

[22] Filed: Feb. 28, 1990

[51] Int. Cl.$^5$ .................. E21B 1/02; E21B 21/06; E21B 21/10

[52] U.S. Cl. .................. 175/135; 173/168; 175/207; 175/218; 175/324; 210/234; 210/235

[58] Field of Search ............ 175/206, 207, 218, 122, 175/135, 215, 212, 214, 324; 173/168, 169, 57; 210/234, 235

[56] References Cited

U.S. PATENT DOCUMENTS

| | | | |
|---|---|---|---|
| 2,122,517 | 7/1938 | Curtis | 175/206 X |
| 2,360,318 | 10/1944 | Dickenson | 173/57 |
| 2,524,336 | 10/1950 | Vokes | 210/187 |
| 2,939,675 | 6/1960 | Karden | 175/169 X |
| 3,244,282 | 4/1966 | Rosaen | 210/234 X |
| 3,272,337 | 9/1966 | Elwell | 210/136 |
| 3,273,715 | 9/1966 | Rosaen | 210/90 |
| 3,327,858 | 6/1967 | Eddy et al. | 210/234 |
| 3,688,910 | 9/1972 | Johnson et al. | 210/233 |
| 4,367,144 | 1/1983 | Peters et al. | 210/234 |
| 4,476,942 | 10/1984 | Elkin | 173/168 X |
| 4,529,514 | 6/1985 | Gruett | 210/234 |
| 4,810,272 | 3/1989 | Overby | 55/420 |
| 4,818,397 | 4/1989 | Joy | 210/232 |

FOREIGN PATENT DOCUMENTS 2752309 5/1979 Fed. Rep. of Germany ...... 175/211

Primary Examiner—Hoang C. Dang
Attorney, Agent, or Firm—Glenn B. Foster

[57] ABSTRACT

A filter apparatus for a percussion device powered by fluid pressure includes a percussion device housing having a fluid inlet and a fluid outlet. A valve is displaced between an open and a closed position. A filter recess is formed within the housing. A filter is inserted within the filter recess for moving the valve from the closed to the open position, thereby permitting fluid pressure to be supplied from the inlet to the outlet.

8 Claims, 1 Drawing Sheet

REMOVABLE FILTER FLUID FLOW SHUTOFF APPARATUS

BACKGROUND OF THE INVENTION

This invention relates generally to a filter for a percussion device, and more specifically a filter to be used in a rock drill and contained within the housing of the rock drill. The rock drill is to be powered by an impure fluid such as water.

Previously, rock drills have been constructed with the filter element connected with the rock drill by a hose element This configuration is awkward considering the weight of the filter and the small work space in which the rock drill is typically used.

This configuration also permitted operation of the percussion device with the filter disconnected from the percussion device. Since the fluid used in these applications is often contaminated, this reduced the lifetime of the percussion device considerably.

The foregoing illustrates limitations known to exist in present rock drills. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus comprising a percussive rock drill with a housing having a recess is formed within the housing, a fluid inlet and a fluid outlet are both in fluid communication with the recess. A valve is displaceably disposed within the recess between an open and a closed position whereby fluid passage between the fluid inlet and the fluid outle is stopped when the valve is in the closed position and permitted when the valve is in said open position. A filter is disposable within the recess. Insertion of the filter means displaces the valve from the closed position to the open position while removal therefrom returns the valve to the closed position.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
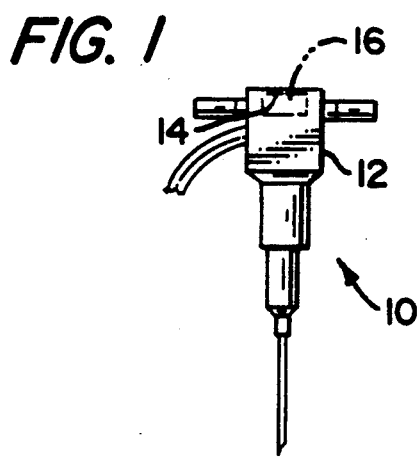
FIG. 1 is a side view of a percussion device illustrating one embodiment of the location of the shutoff valve of the in invention.

A percussion device shown generally at 10, such as a jackhammer, is formed with a housing 12. An internal filter recess 14 is formed within the housing 12. A filter 16, which is mounted on a filter apparatus 18, is removably disposed within the recess 14.

The filter 16 is used to filter a fluid, such as water or air, used in the operation of the percussion device. During the normal operation of the percussion device 10, fluid passing from a fluid inlet 20 to a fluid outlet 22 must pass through filter 16. The fluid passing through the filter outlet 22 will be used to operate the percussion device.

Figure 3:
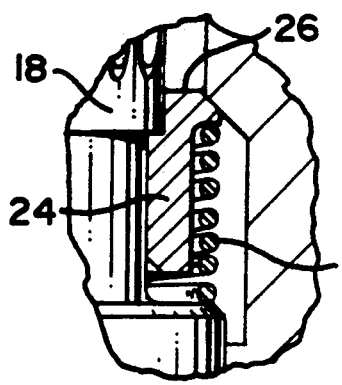
FIG. 3 is a cross sectional view of the valve portion of FIG. 2 with the valve in the closed position.
Figure 2:
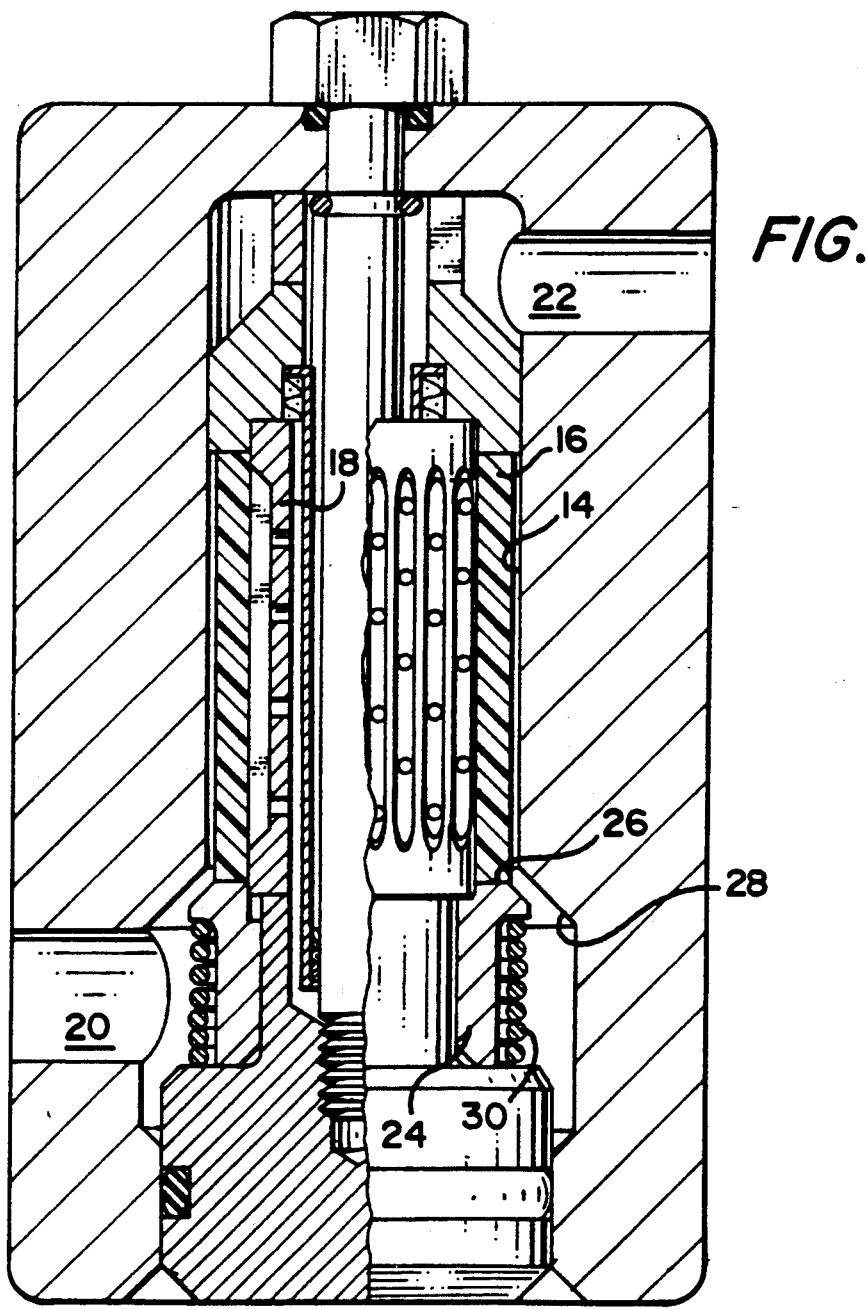
FIG. 2 is a split cross sectional view on the left side of the figure, and an elevation view on the right side of the figure, illustrating an embodiment of the removable filter flow shutoff apparatus of the instant invention, with the filter in the inserted position.

A valve means 24 can be displaced between an open position (as shown in FIG. 2), and a closed position (as shown in FIG. 3). When the valve is in a closed position, a shoulder or contact means 26 of the valve means 24 acts against a valve seat means 28, and acts as a seal to prevent the flow of fluid from the fluid inlet 20 to the fluid outlet 22. Whenever the valve 24 is open, the fluid flows freely between the inlet and the outlet.

Insertion of the filter apparatus 18 into the filter recess 14 with the filter 16 on the filter apparatus will cause the filter 16 to act against the shoulder 26. This will displace valve means 24 from the closed to the open position, and permit the proper functioning of the percussion device 10.

However, if the filter apparatus 18 is inserted into the filter recess 14 with the filter 16 removed from the filter apparatus 18, the valve means 24 will remain seated against the valve seat means 28 under the force of a spring 30. Fluid passing from the inlet 20 to the outlet 22 will therefore be blocked, and the percussion device will be inoperative.

This configuration ensures that the percussion device 10 will be able to be operated only on fluid which has passed through filter 16, and encases the bulky filter element within the percussion device housing 12.

Having described the invention, what is claimed is:

1. An apparatus comprising:
   a percussive rock drill including a housing having a recess formed within the housing, a fluid inlet and a fluid outlet are both in fluid communication with the recess;
   a valve is displaceably disposed within the recess between an open and a closed position, whereby fluid passage between the fluid inlet and the fluid outlet is stopped when the valve is in said closed position, and fluid is permitted to flow when the valve is in said open position; and
   a filter disposable within the recess wherein insertion of the filter means displaces the valve from the closed position to the open position while removal therefrom returns the valve to the closed position.

2. The apparatus as described in claim 1, further comprising:
   spring means for biasing the valve towards the closed position.

3. The apparatus as described in claim 1, further comprising;
   contact means formed on the valve for contacting the filter to displace the valve into the open position.

4. The apparatus as described in claim 3, wherein the contact means forms a substantial sealing engagement with the filter when in contact therewith.

5. An apparatus comprising:
   a percussive rock drill including a housing having a recess formed within the housing, a fluid inlet and a fluid outlet are both in fluid communication with the recess;
   valve means displaceably disposed within the recess between an open and a closed position, for stopping fluid passage between the fluid inlet and the fluid outlet when the valve means is in said closed position and for permitting fluid to flow when the valve means is in said open position; and filter means for filtering fluid passing between the fluid inlet and the fluid outlet wherein insertion of the filter means into the recess displaces the valve into the open position while removal of the filter means from the recess displaces the valve into said closed position.

6. The apparatus as described in claim 5, further comprising:
spring means for biasing the valve means towards the closed position.

7. The apparatus as described in claim 5, further comprising:
contact means formed on the valve means for contacting the filter means to displace the valve into the open position.

8. The apparatus as described in claim 7, wherein the contact means forms a substantial sealing engagement with the filter means when in contact therewith.

* * * * *